June 30, 1970          C. KIM          3,517,673
EYELASH MEASURING DEVICE AND TRIMMER
Filed April 23, 1969          4 Sheets-Sheet 1
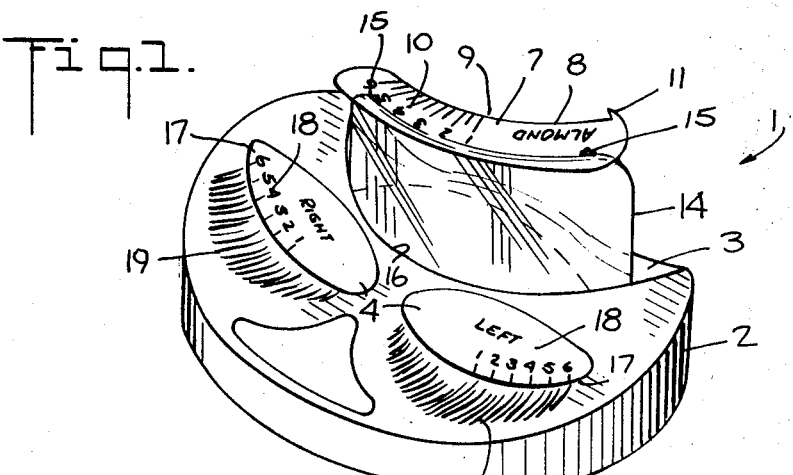
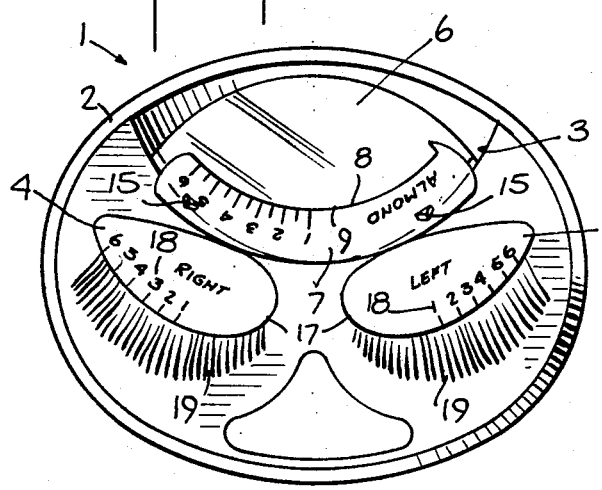
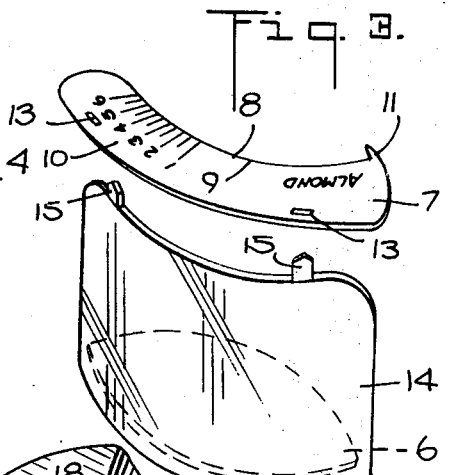
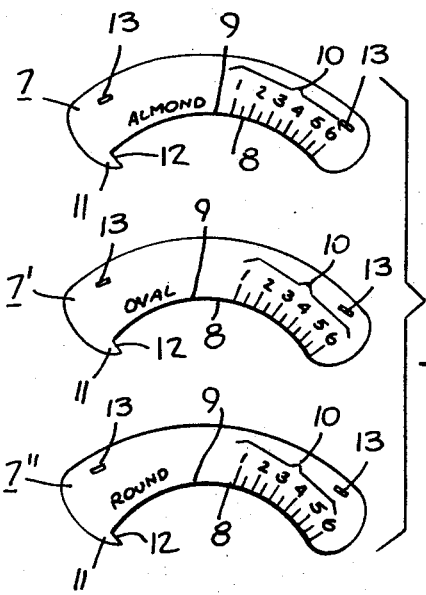
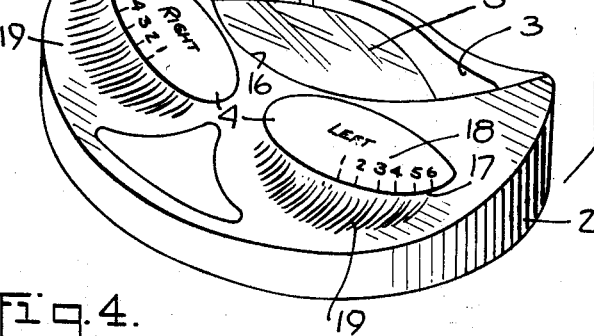
INVENTOR.
CHARLES KIM
BY
ATTORNEYS June 30, 1970  C. KIM  3,517,673
EYELASH MEASURING DEVICE AND TRIMMER
Filed April 23, 1969  4 Sheets-Sheet 2
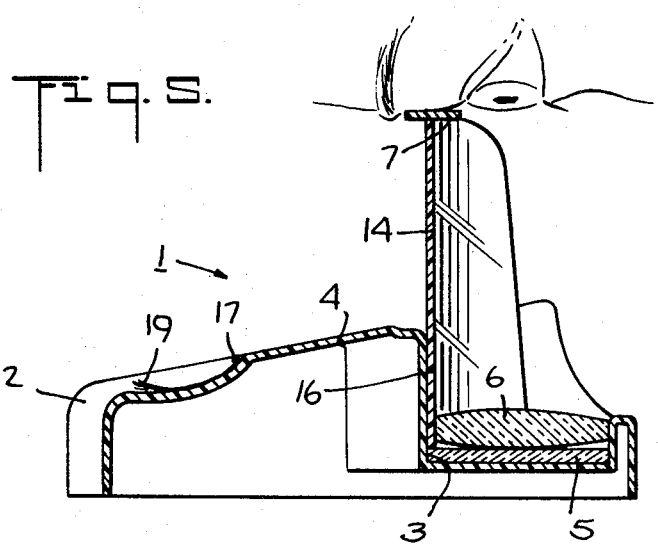
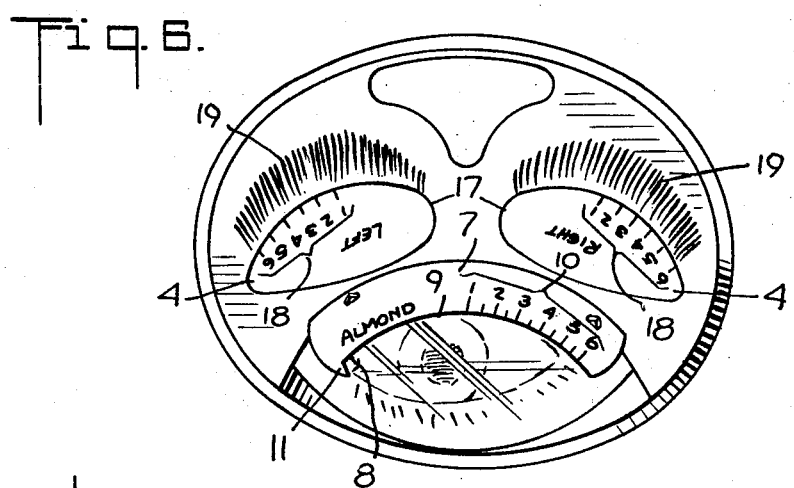
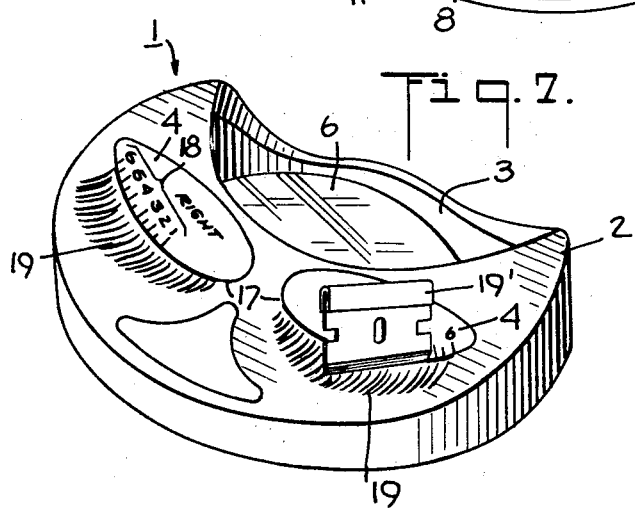
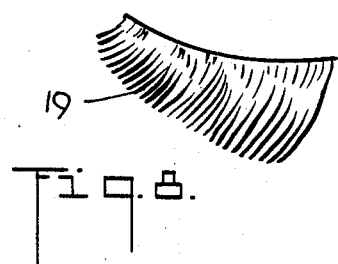
INVENTOR.
CHARLES KIM
BY
Kenyon & Kenyon
ATTORNEYS

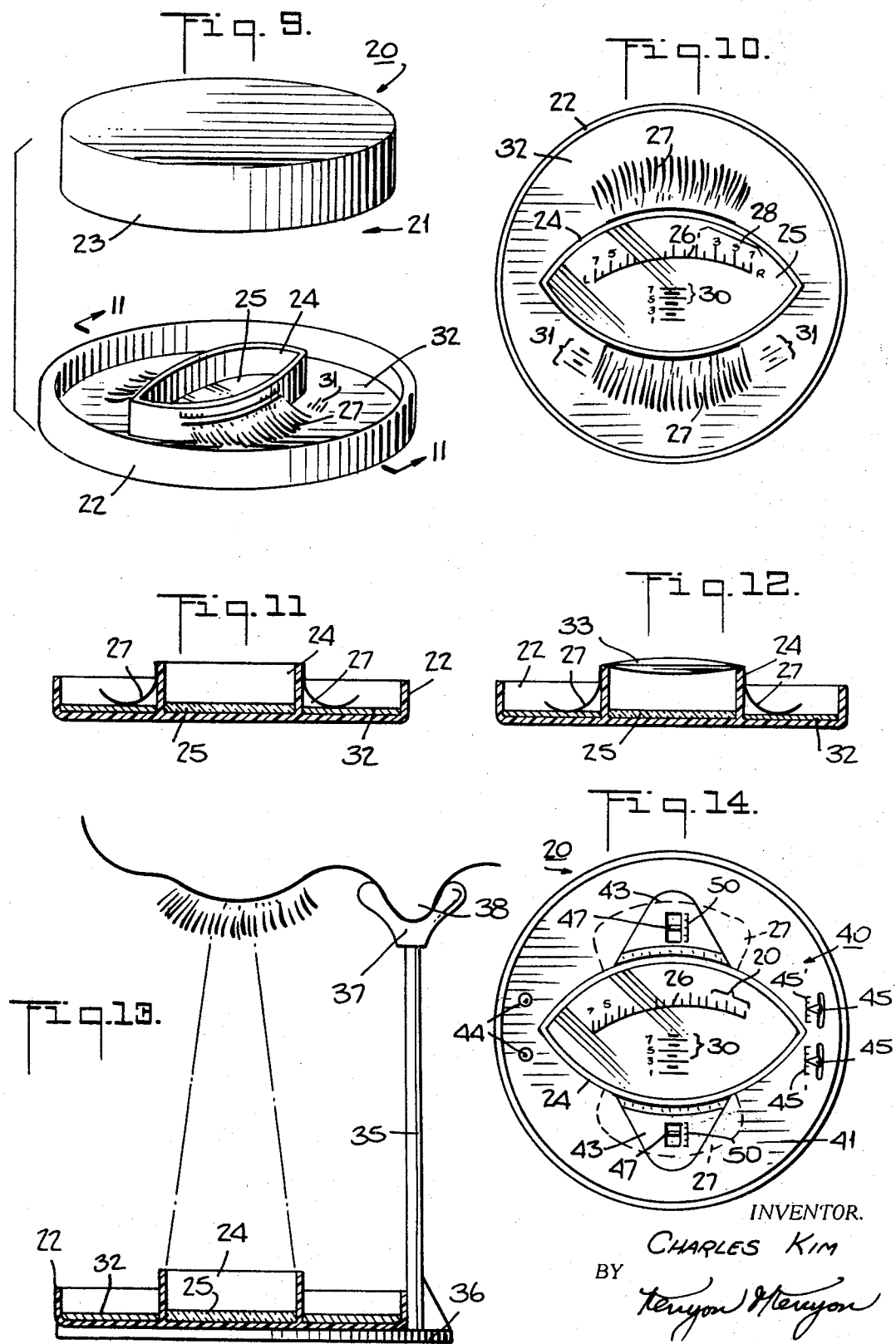

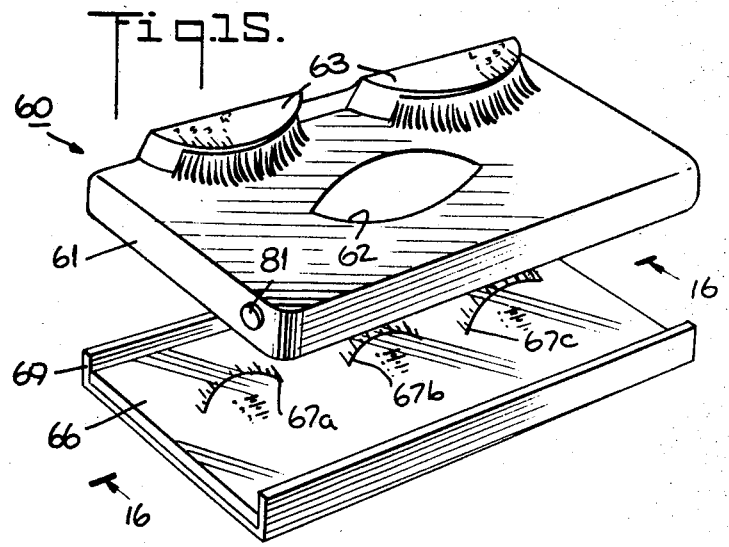
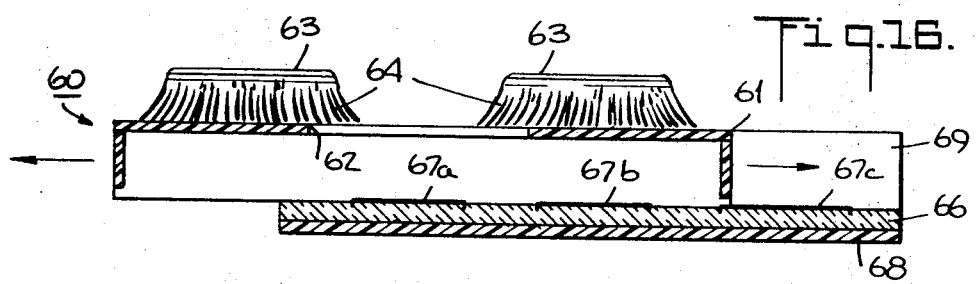
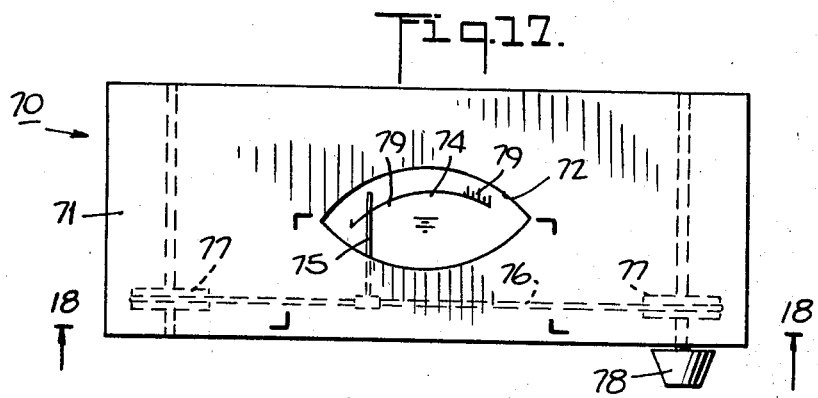
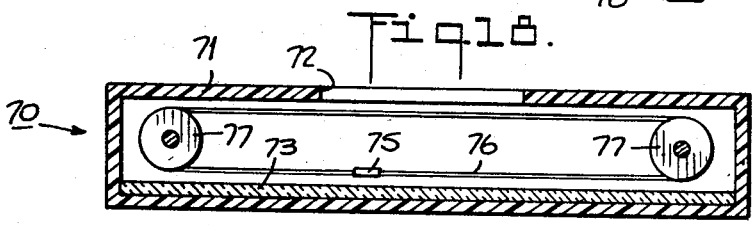

United States Patent Office 3,517,673
Patented June 30, 1970

3,517,673
EYELASH MEASURING DEVICE AND TRIMMER
Charles Kim, 215 W. 83rd St.,
New York, N.Y. 10024
Continuation-in-part of application Ser. No. 750,427,
July 31, 1968. This application Apr. 23, 1969, Ser.
No. 818,635
Int. Cl. A45d 40/00
U.S. Cl. 132—79
34 Claims

ABSTRACT OF THE DISCLOSURE

The measuring device permits a false eyelash to be accurately sized to complement the user's eye both as to shape and length. The trimmer allows a false eyelash to be cut accurately to size and shape. The measuring device is used manually by an individual to suit the individual's taste.

---

This application is a continuation-in-part of my application, Ser. No. 750,427, filed July 31, 1968.

This invention relates to an eye measurer. More particularly, this invention relates to a measuring device for individual measurement of a natural eye. Still more particularly, this invention relates to a manually manipulated eye measurer for measuring an individual's eye for the application of a false eyelash.

Heretofore, many types of measuring devices have been known which have been associated with the measurement of an individual's eyes. For example, in the optical field, various types of pupilometers have been used to measure the pupillary distance between the pupils of each eye and the distance between each pupil and the nose. Also, various measuring devices have been used to measure the size and contour of an eye for purposes of fitting contact lenses thereto or for measuring the shape and size of an eye, for example, by a so-called boxing method, in order to fit an eyeglass lens.

However, these heretofore measuring devices have not been used for cosmetic purposes. That is, these measuring devices have not been used or are they capable of use in measuring an eye and correlating the results, for example, to the shape and size of a false eyelash to be applied to the eye.

False eyelashes have been used cosmetically in order to complement a user's personal appearance. However, due to the great variation in eye sizes and shapes of individual users, it has been inconvenient to manufacture, sell and stock false eyelashes for each shape and size. Consequently, only a limited number of false eyelash shapes and sizes have been available for selection of an appropriate false eyelash for a user.

Thus, in those instances where a particular pair of false eyelashes has been purchased, the user has frequently been required to cut or otherwise shape the false eyelashes to the size and shape desired in order to obtain the most advantageous cosmetic value from the eyelashes when in use. In such instances, the user has usually been confined to the use of scissors or the like cutting implements to shape the eyelashes. This, however, has led to an inaccurate sizing and shaping of the eyelashes as the user generally lacks the degree of skill and experience needed to properly cut the eyelashes. Furthermore, the user has usually relied on guesswork in order to determine how and where the false eyelash should be cut and shaped to most complement the user's appearance.

While devices have been used in the past to aid in the measurement of a natural eyelash for the cutting of a false eyelash to the same length, such devices have been cumbersome and difficult to use. Also, where the same device has been used by different users having different basic eye shapes, such devices have been inaccurate in providing measurement which would most complement the user's eyes.

Accordingly, it is an object of the invention to shape and size a single standardized eyelash to a large number of different eyes.

It is another object of the invention to accurately measure an eye for the application of false eyelashes thereto.

It is another object of the invention to provide accurate eye measurements for trimming a set of false eyelashes to a desired size and shape for complementing a user's eyes.

It is another object of the invention to provide a measuring device for conveniently measuring the eye of a user for application of an appropriately sized false eyelash thereto.

It is another object of the invention to provide a compact eye measurer which can be manipulated by an individual for self-measurement of the individual's eyes.

Briefly, the invention provides a measuring device which is used to accurately determine the size and shape of the eyes of a user so as to thereafter accurately size and shape a set of false eyelashes complementary thereto.

In one embodiment, the eye measurer includes a compact housing in one section of which a mirrored surface is secured with an overlying lens for reflecting a user's eye therein. In addition, the eye measurer includes an eye rest which extends upwardly from the mirrored surface to accurately space a user's eye from the mirrored surface so as to coincide the eye with the focal point of the lens. Also, a series of transparent inserts, each of which is provided with a contoured gauge line representing a standard shape of eye such as round, almond, and oval, is provided for affixing to the top of the eye rest in line with the mirrored surface and lens. Each of these inserts also has a set of scaled indicia marks along the gauge line which represents different lengths of eyes. In use, the user sets the transparent insert having the contoured gauge line corresponding to her eye on the eye rest and then holds the eye measurer up to her eye with her eye and the reflected gauge line in alignment. The length of the user's eye is then noted from the indicia marks along the gauge line.

The eye measurer housing also has a pair of symmetrical eyelash mounting blocks in another section, each of which has a curvilinear wall which is contoured on a curve correlated with the gauge lines on the transparent inserts. Each wall mounts a false eyelash thereon along a scale which is correlated with the scales on the transparent inserts. After the user has determined an eye size, the false eyelash for that eye is cut at the point on the mounting block corresponding to that size.

In another embodiment, the measuring device includes a mirrored surface on which a gauge line representing the shape of the user's eye is placed. In addition, a first set of indicia marks are scaled along the gauge line to indicate the length of the user's eye and a second set of indicia marks are scaled below the gauge line to indicate the width, or opening, of the user's eye. The sets of indicia marks are positioned in a predetermined position relative to the gauge line so as to accurately indicate the length and width of a user's eye when the mirrored surface is placed at a predetermined distance from the eye being measured. Further, the second set of indicia marks are positioned to indicate a measured width equal to about one-quarter inch more than the actual opening since natural eyelashes have been found to be of such measured widths in general.

This measuring device is also provided with an upraised wall about the mirrored surface for mounting of a set of false eyelashes thereon. The upraised wall is shaped to conform with the gauge line on the mirrored surface such that one side of the wall is parallel to the gauge line and the opposite side is symmetrically arranged thereon. Also, each side of the wall upon which the respective eyelashes are mounted has a scale thereon which corresponds to the first set of indicia marks along the gauge line. Each of the eyelashes is mounted on the wall alongside each scale so that the eyelash can be cut at the correct length with respect to the measured eye length.

In another embodiment, a lens with a fixed focal point is mounted over the mirrored surface so that the measured device will be correctly positioned with respect to the user's eye.

In still another embodiment, an upstanding collapsible bracket is mounted over the mirrored surface to form an eye rest. The bracket is used to facilitate positioning of the user's eye at a fixed distance from the mirrored surface.

In still another embodiment, a gauge line as above is positioned over a mirrored surface within an apertured housing and a dial indicator is mounted on the housing to indicate the length of the user's eye. In this embodiment, an indicator needle is mounted to glide over the gauge line under the influence of a rotatable knob located outside the area occupied by the mirrored surface. Also, the knob cooperates with an adjacent scale to indicate the length of eye measured. This scale further cooperates with a scale along which a false eyelash is mounted so as to indicate the point at which the eyelash is to be cut.

In still another embodiment, a single mirrored surface is provided with three gauge lines representing the three basic eye shapes of round, almond, and oval. Each gauge line has a set of indicia marks adjacent thereto to represent the length of an eye. This mirrored surface cooperates with an apertured frame on which a pair of eyelashes are removably mounted so that the frame can be slid over the mirrored surface to present the gauge line appropriate to the user's eye. As the gauge lines are of different shape, the measured length and width of differently shaped eyes varies from shape to shape. Accordingly, a plurality of scales are provided adjacent the eyelash mountings for selectively indicating the respective points of cutting of the eyelashes for each eye shape. Alternatively, one scale can be used where a conversion table is used to correlate the measured lengths of different eye shapes.

These and other objects and advantages of the invention will become more apparent from the following detailed description and appended claims taken in conjunction with the accompanying drawings in which:

FIG. 1 illustrates a perspective view of an eye measurer according to the invention;

FIG. 2 illustrates a plan view of the eye measurer of FIG. 1;

FIG. 3 illustrates an exploded view of the eye measurer of FIG. 1;

FIG. 4 illustrates a plan view of a series of transparent inserts having standardized eye shapes formed thereon;

FIG. 5 illustrates a cross-sectional view of the eye measurer with a user's eye in place for measuring;

FIG. 6 illustrates a view of the eye measurer of FIG. 5 as viewed;

FIG. 7 illustrates a manner of cutting the eyelashes on the mounting blocks;

FIG. 8 illustrates a view of a false eyelash cut according to the invention;

FIG. 9 illustrates an exploded perspective view of an eye measuring kit incorporating a modified eye measuring device of the invention;

FIG. 10 illustrates a plan view of the measuring device of FIG. 9 with a pair of eyelashes mounted on opposite sides of the upraised wall;

FIG. 11 illustrates a view taken on line 11—11 of FIG. 9;

FIG. 12 illustrates a view similar to FIG. 11 of a modified measuring device utilizing a lens according to the invention;

FIG. 13 illustrates a cross-section view of another modified eye measuring device with a mounting bracket;

FIG. 14 illustrates a top view of a trimmer in place over the measuring device of FIG. 10;

FIG. 15 illustrates an exploded perspective view of a modified measuring device of the invention;

FIG. 16 illustrates a view taken on line 16—16 of FIG. 15;

FIG. 17 illustrates a plan view of a measuring device according to the invention utilizing a movable dial indicator; and FIG. 18 illustrates a view taken on line 18—18 of FIG. 17.

Referring to FIGS. 1, 2 and 3, the eye measurer 1 includes a contoured housing 2, for example, of molded plastic, which is integrally formed with a well 3 in one section and a pair of mounting blocks 4 in another section. The well is provided with a flat mirrored surface 5, for example, a mirror which is secured as by an adhesive, on the floor of the well 3. The mirrored surface 5 is preferably of eye shape; however, any suitable shape can be used.

In addition, a lens 6, for example, of double concave shape is positioned over the mirrored surface and can be secured in the well 3, for example, by adhesives or a force fit. The lens 6 is formed with respect to the mirrored surface 5 so as to have a focal point which is spaced about three inches from the mirrored surface 5. The lens 6 allows a user to hold the eye measurer 1 at an accurate close distance from the user's eye so as to permit measurements to be taken accurately. As the lens 6 has only one focal point, all users must hold the eye measurer 1 at the same spaced distance.

Referring to FIG. 4, in order to measure an eye, a series of transparent inserts 7, 7', 7" are provided, each of which corresponds to one of three basic eye shapes, i.e. almond, oval, and round. A fourth insert can also be used which corresponds to the average of these three basic shapes. Each insert 7, 7', 7" has a curvilinear edge 8 which is shaped to conform to one of the particular basic eye shapes as well as an opaque gauge line 9 which runs along this edge 8. Also, a scale of opaque indicia marks 10 is set down along the line 9 to one side of the insert. Further, each insert 7, 7', 7" has a projection 11 at the opposite side of the insert from the scale 10 which may have an opaque line 12 along the edge for definition of the edge. This projection 11 serves to form a notch with the edge 8 to mark the beginning of the gauge line 9 and represents the corner of a person's eye. Each insert 7 is also formed in a crescent shape so as to be more conveniently handled and is provided with a pair of spaced slots 13. Finally, each insert 7, 7', 7" can be labeled so as to indicate the basic eye shape to which it corresponds.

Referring again to FIGS. 1, 2 and 3, in order to facilitate positioning of an insert 7 at the correct focal point distance over the lens 6, an eye rest 14, for example, a clear flat plastic plate, is removably mounted in the well 3 of the housing 2 to project upwardly in parallel relation to the focal axis of the lens 6. This plate 14 is of a length (or height) corresponding approximately to the focal length of the lens 6 and has a pair of tabs 15 on the upper edge which are received in the slots 13 of an insert 7 to support and hold the insert 7 in position at the focal point of the lens 6. The plate 14 is further of substantially rigid material and thickness as to be self-supporting while also being sufficiently wide and flexible as to be bent into conformity with the forward wall 16 of the well 3. Thus, the plate 14 can be held in place by a friction fit with the walls of the well 3.

Each mounting block 4 is formed with a curvilinear wall 17 which is correlated with the shapes of the gauge lines 9 of the inserts 7, 7', 7" and is provided with a scale 18 of indicia marks which is keyed to the scales on the inserts 7. That is, the scale 18 represents the same length for each insert whereas, each insert scale 9 represents the length of eyelash most suitable for the eye shape being measured. In addition, a false eyelash 19 is adhered to each wall 17 along the scale 18 so that the length of the eyelash 19 as measured by the scale 18 is keyed directly to the scale 10 of the respective insert 7. In this way, for example, should an individual measure her eye by the use of the insert 7 for an almond shaped eye, the indicia mark or number obtained from the insert 7 represents the marked point on the scale 18 of the mounting block 4 at which the false eyelash should be cut. Also, should the other inserts be used by other individuals having those basic eye shapes, the measured lengths are likewise obtained for indicating where the eyelashes should be cut.

It is noted that the respective mounting blocks 4 are symmetrically arranged so as to represent a right-hand eye and a left-hand eye. Similarly, the eyelashes 19 are symmetrically arranged so that the shape is oriented with the shorter lashes to the inside.

Referring to FIG. 5, in order to use the eye measurer 1 to measure an individual's eyes, the scaled insert corresponding to the basic shape of the individual's eye is first selected, for example, the almond insert 7. Then, the plastic plate 14 is inserted upright into the well 3 of the housing 2 about the lens 6. The scaled insert 7 is then mounted on the top of the plate 14 by passing of the tabs 15 through the slots 13. In this position, in order to measure a right eye, the projection 11 is at the left-hand side of the plate 14 as viewed. Next, the housing 2 is lifted manually by the individual or placed on a support surface with the individual bending over so that the insert 7 is held next to the individual's right eye. The notch formed by the projection 11 and edge 8 is then aligned with the corner of the eye via the reflected image of the eye (FIG. 6). Thereafter, the indicia mark on the scale 10 which corresponds with the end of the white of the eye at the right-hand side is noted. This indicia mark represents an exact eye measurement of length. While the eyelashes 19 are still mounted on the blocks 4, each is cut, as by a razor 19', at the mark on the scale 18 that corresponds to the individual's exact eye size. The cut eyelashes 19 are then removed (FIG. 8) and applied in a conventional manner.

It is noted that should the measurement of the left eye be required, it is only necessary to flip the insert 7 over on itself before following the above measuring procedure. Of course, the indicia marks of the scale 10 would be read backwards.

It is further noted that the eye measurer 1 can be mounted with a suitable carrying case or kit. For example, the housing can be provided with a removable cover, such as a transparent cover, and a removable back which allows the inside of the housing to be used as a storage area for the scaled inserts and removable eye rest plate as well as other paraphernalia such as eyelash adhesives for securing the eyelashes to an eyelid.

It is also noted that while three scaled inserts have been described above, an eye measurer can be customed for use with only the one scaled insert corresponding to an individual's eye, e.g. almond. Also, the curved walls of the mounting blocks can be formed as a duplicate of the gauge line of this insert. In any event, as above, the scale on the mounting block is laid out in conformity with the scale on the gauge line of the insert. Further, the eye rest can be formed as an integral member with the housing such as by being formed as a telescoping member.

Referring to FIG. 9, an eyelash kit 20 includes a two-piece housing 21 having a base 22 and a cover 23. The housing 21 is formed of any suitable material such as plastic and the cover 23 is transparent so as to permit viewing of the contents of the kit 20.

Referring to FIGS. 9 to 11, the base 22 which can be circular in shape has an upraised wall 24 about the center which defines an enclosed area. This wall 24 is made integrally with the base 23 or is otherwise secured to the base 23 as by bonding. Also, a mirrored surface 25 is secured to the base 23 within the enclosed area of the wall 24. The surface 25 is made of any suitable mirrored material such as a coated plastic, silvered glass, or the like. A gauge line 26 (FIG. 10) is formed on the mirrored surface 25 to represent the upper contour shape of an eye. For example, the gauge line 26 can be shaped to represent a round, almond, or oval shape or an average of these three shapes as above described. Further, the gauge line 26 is formed on the mirrored surface in a precise manner according to the curvilinear shape of an eye as above described. The application of the gauge line 26 can be done by inking, etching, plating, or the like.

The shape of the wall 24 is correlated to the shape of the gauge line 26 so that one side is parallel to the gauge line 26 while the opposite side is symmetric thereto. Each side of the wall 24 has one of the pair of false eyelashes 27 removably mounted thereon as by a pressure sensitive adhesive.

A first set of indicia marks 28 are placed on the mirrored surface 24 along the length of the gauge line in ascending order to indicate the length of a measured eye. A scale 29 (FIG. 9) is similarly provided on each side of the wall 24 adjacent the eyelashes 27 in correlation with the indicia marks 28 to indicate the measured eye length on the eyelashes 27.

Similarly, a second set of indicia marks 30 disposed horizontally with respect to the gauge line 26 is provided on the mirrored surface 25 to measure the width or opening of an eye. A scale 31 is provided adjacent the wall 24 on an insert 32 within the base 22 or directly on the surface of the base and adjacent to each eyelash 27 on one or both sides thereof. The scales 31 are correlated to the second set of indicia marks 30 to indicate the length of the hairs of the eyelash for a measured eye. In this latter regard, it has been determined that the hair length of a natural eyelash exceeds the eye opening of about ¼ inch. Accordingly, the scales 31 are marked to add this excessive length to the measured value obtained from the indicia marks 30.

The respective indicia marks 28, 30 and scales 29, 31 are accurately placed on the measuring device 20 to correlate with the gauge line 26 so as to permit an accurate sizing and shaping of an eyelash 27 to a measured eye.

In use, the user holds the base 22 of the measuring device 20 a predetermined distance in front of the eye to be measured, i.e. the left eye for the device as shown in FIG. 10. This predetermined distance is correlated to the gauge line 26 so that the correct size of the eye can be measured by the device 20. For example, the base 22 is held so that the mirrored surface 25 is seven inches from the eye. Next, with the gauge line 26 aligned along the upper contour of the eye with the right hand end positioned at the right end of the eye and the indicia marks 30 disposed horizontally, the length of the eye is determined from the indicia mark over the left end of the eye. At the same time, the eye opening is determined from the indicia mark at the bottom edge of the eye. Thereafter, each eyelash 27 is cut to the measured length and width of the correlated points defined by the indicia of the scales 29, 31. Thus, the shaped eyelashes 27 are then removed from the wall 24 and applied to the respective eyelids of the user.

Referring to FIG. 12, wherein like numerals have been used to indicate like parts as described above, in order to ensure that the mirrored surface 25 is positioned at the correct distance from the eye of a user, a measuring device 33 is provided with a lens 34 having a fixed focus. The lens 34 is mounted on the wall 24 over the mirrored surface 25. As the lens 34 has only one focal point, the mirrored surface 25 is held at the same distance from the eye of any user. The measuring device 33 is used in the same manner as that above described.

Referring to FIG. 13, wherein like numerals have been used to indicate like parts as above, an alternate manner of ensuring the correct positioning of the measuring device 20 from a user's eye includes the use of a bracket 35 which is mounted in a vertical manner on the base 22. To this end, the mounting bracket 35 can be mounted on a flat surface 36 adjacent the periphery of the base 22 (as shown) or can be mounted directly on the insert 32 (not shown). This mounting bracket 35 which can be collapsible so as to permit reduction in size for packaging with the measured kit 20 (FIG. 9) has a nose rest 27 for supporting a user's nose 38 therein in a position to align the user's eye 39 with the mirrored surface 25. Alternatively, any mounting bracket can be used to fix a portion of the user's head, e.g. the forehead, a fixed distance from the measuring device.

Referring to FIG. 14, wherein like numerals have been used to indicate like parts as above, the measuring device 20 cooperates with a trimmer 40 as described in copending application, Ser. No. 750,427, filed July 31, 1968 which cuts the eyelashes 27 to a shape desired. The trimmer 40 also functions to feather the free ends of the eyelash hairs. The trimmer 40 includes a template 41 of circular shape which is sized to fit within the base 22 of the measuring device. The template 41 includes a central aperture 42 which is shaped partially to fit about the wall 24 of the base 22. Further, a pair of crescent shaped elements 43 are adjustably mounted on the template 41 to pivot about one end transversely of the aperture 42 and the wall 24 of the measuring device when in place. Each element 42 is pivotally secured at one end, as by a rivet 44, to the template 41 and has a pointer 45 at the opposite end which cooperates with a scale 45' on the opposite surface of the template 41 to indicate the degree of shape to be imparted to a cut eyelash. Also, a pair of arcuate slides (not shown) are adjustably mounted on the elements 43. Each slide has a centrally located tang 47 which projects through a crescent shaped element 43 and the template 41 and a pair of bent flanges (not shown) which slide within suitable slots of an element 43. Each slide is slidable transversely of an element 43 via the tang 47 so as to adjust the trimmer 40 to cut the eyelash hairs to the measured length. A suitable scale 50 which is correlated with the measuring indicia marks 30 on the measuring device 20 is placed on each element 43 to cooperate with the tanks 47 to ensure correct positioning of the slides. Each slide has an endless cutting blade (not shown) mounted thereon within a suitable holder for exposing sequential portions of the blade as well as a plurality of groups of needle-like cutting elements having cutting edges. The blade and cutting elements are used to cut an eyelash in a predetermined shape. For example, depending on the amount of pivoting of the elements 43 relative to the template 41, an eyelash can be cut with a shape which is of uniform hair length along the length of the eyelash, or of decreasing or increasing hair length along the length of the eyelash.

In use, after a user's eye length and width are measured with the measuring device 20 as above described, the degree of shape for the eyelashes 27 is selected, for example, from a catalogue of shapes, and the elements 43 are pivoted on the template 41 until the pointers 45 reach the points on the scales 45' representing such shape. The movement of the elements 43 can be accomplished manually or mechanically as well as individually or simultaneously. Next, the slides are moved via the tangs 47 until the tangs 47 reach a point on the respective scales 50 correlated to the measured eye opening. Thereafter, with the cutting blade and needle-like cutting elements having chisel-like cutting ends disposed downwardly, the trimmer 40 is placed within the measuring device 20 about the wall 24 and is pressed down against the eyelashes 27 and insert 32 which can be suitably padded. This causes the cutting blade and cutting elements to shape and feather the eyelashes 27. The trimmer 40 is then removed from the measuring device 20. The eyelashes 27 can then be cut to the measured length and removed for mounting on the user's eyelids. Alternatively, the eyelashes can be cut to the measured length before shaping and feathering by the trimmer 40.

Referring to FIGS. 15 and 16, an alternate measuring device 60 includes a frame 61 which has an aperture 62 and a pair of arcuately shaped mounting blocks 63 for a pair of eyelashes 64. Each mounting block 63 removably mounts an eyelash 64 along a scale 65 which indicates the length of the eyelash. The aperture 62 can be covered over with transparent material or a lens of fixed focal length can be disposed therein for purposes as described above. Additionally, the measuring device 60 includes a mirrored surface 66 similar to that above on which three gauge lines 67a, 67b, 67c are formed. Each of these gauge lines represent one of the three basic eye shapes so that the measuring device 60 can be used accurately for each eye shape rather than relying on a close approximation as with a gauge line which is the average of the three shapes. The mirrored surface 66 is mounted in a guideway 68 having upstanding sidewalls 69 between which the frame 61 can be slid so as to present any one of the three gauge lines 67 within the plane of the aperture 62. Alternatively, the measuring device 60 can be provided with an indicating means including an indicating needle movably mounted within the plane of the aperture 62 and a rotatable knob 81 for actuating the needle indicator. In operation, upon rotation of the knob 81 the needle indicator is caused to move across the respective gauge line 67 so as to indicate the length of the eye.

The operation of the measuring device 60 is similar to the above and therefore the various indicia marks on the mirrored surface 65 have not been further described.

Referring finally to FIGS. 17 and 18, another alternate measuring device 70 includes a housing 71 which has a centrally located aperture 72 and a mirrored surface 73 mounted therein below the aperture 72. A gauge line 74 is formed on the mirrored surface 73 as above to represent an eye shape and is aligned with the aperture 72 which can be open, covered with transparent material or covered by a lens (not shown). Also, a dial indicator means is mounted in the housing 71 to indicate the measured length of an eye. This indicator means includes an indicator needle 75 which is fixed on an endless belt 76 to move across the aperture 72 and gauge line 74. The endless belt 76 passes over a pair of pulleys or gears 77 which are journalled in the housing 71 and which are rotated via an indicator knob 78 projecting from the housing 71. Rotation of the knob 78 thus causes simultaneous movement of the needle 75.

Sets of indicia marks 79, 80 are formed on the mirrored surface 73 along the gauge line 74 to indicate the measured length and width of an eye. Alternatively, the indicia marks for length can be disposed about the knob 78 and the knob can be provided with a pointer so as to indicate the value of the measured eye length determined by the needle 75.

The operation of the measuring device 70 is such as to permit determination of the length and width of an eye via indicated indicia marks. These indicia marks can be used with a catalogue of indicia marks and eye shapes to give a set of values or points at which a mounted eyelash is to be cut so as to conform with the measured eye length and width. Thus, the eyelash can be mounted on a flat base rather than a rounded base.

It is noted that the various embodiments of the invention described above can be provided with only a gauge line for measuring the eye length or can be provided with a gauge line for eye length and a scale for measuring the opening of an eye. In the latter case not only can the proper length of false eyelash for an eye be measured but also a proper length of lash.

The invention thus provides a simple to use eye measuring device for accurately determining the size of an eye as well as the size of a false eyelash which would most complement the eye. The measuring device can be made of relatively inexpensive materials as well as in a compact manner. Further, the measuring device can be manipulated by the wearer of the false eyelashes in a manner which requires little skill.

What is claimed is:

1. A measuring device for measuring an eye comprising:
   a mirrored surface for reflecting the image of the eye to be measured;
   a gauge line on said mirrored surface representing a predetermined eye shape for aligning with the eye to be measured; and
   indicating means for indicating the length of the measured eye along said gauge line.

2. A measuring device as set forth in claim 1 wherein said mirrored surface has a plurality of said gauge lines thereon, each said gauge line representing one of a number of predetermined eye shapes.

3. A measuring device as set forth in claim 2 wherein one of said gauge lines represents the average of the remainder of said gauge lines.

4. A measuring device as set forth in claim 2 which further comprises a guideway having a pair of upstanding sidewalls mounting said mirrored surface therebetween, and a frame slidably mounted over said mirrored surface between said sidewalls, said frame including an aperture disposed over the plane of said gauge lines, a pair of mounting blocks for mounting a pair of false eyelashes thereon, and a scale along the mounting of each eyelash on said mounting blocks in correlation with said gauge lines to indicate the points at which each eyelash is to be cut to conform to the measured length of an eye.

5. A measuring device as set forth in claim 1 further comprising means for indicating the width of a measuring eye transversely of said gauge line.

6. A measuring device as set forth in claim 1 wherein said indicating means includes a movable needle indicator mounted over said gauge line and rotatable means for moving said needle indicator along said gauge line to measure the length of an eye.

7. A measuring device as set forth in claim 6 wherein said indicating means further includes means adjacent said gauge line for indicating the length of a measured eye.

8. A measuring device as set forth in claim 1 further comprising means mounted along said mirrored surface for mounting a pair of false eyelashes thereon, said means mounting one of the eyelashes in parallel relation to said gauge line and the other of the eyelashes in symmetric relation thereto, and a scale on said means adjacent to each of the mounted eyelashes in correlation with said indicating means to indicate the points at which each eyelash is to be cut.

9. A measuring device as set forth in claim 1 further comprising an upraised wall enclosing the periphery of said mirrored surface, said wall having one side parallel to said gauge line and an opposite side in symmetry thereto, each of said sides having a scale thereon in correlation with said indicating means for mounting of a false eyelash therealong whereby each scale indicates the points at which each eyelash is to be cut to conform with the measured length of an eye.

10. A measuring device as set forth in claim 9 wherein said indicating means includes a first set of indicia marks positioned along said gauge line and which further comprises a second set of indicia marks spaced from said gauge line in horizontal relation thereto for measuring the opening of an eye.

11. A measuring device as set forth in claim 10 further comprising scale means spaced from each side of said wall alongside each eyelash in correlation with said second set of indicia to indicate the points at which the hairs of each eyelash are to be cut to conform with the measured opening of an eye.

12. A measuring device as set forth in claim 9 further comprising a lens having a fixed focal point mounted on said wall over said mirrored surface and gauge line.

13. A measuring device as set forth in claim 9 further comprising a mounting bracket disposed perpendicularly to said mirrored surface and gauge line to position an eye at a predetermined distance from said gauge line.

14. A measuring device as set forth in claim 9 further comprising a base mounting said wall centrally thereof and a cover disposed over said base for enclosing said wall therebetween.

15. A measuring device as set forth in claim 14 further comprising an insert on said base about said wall, said insert having a second set of indicia marks thereon alongside each eyelash disposed over said insert to indicate the points at which the hairs of each eyelash are to be cut.

16. A measuring device as set forth in claim 1 further comprising a housing enclosing said mirrored surface and having an aperture in alignment with the plane of said gauge line, and wherein said indicating means includes a needle indicator mounted within said housing over said gauge line, and means for moving said needle indicator across said gauge line to measure an eye length.

17. A measuring device as set forth in claim 16 wherein said indicating means further includes a set of indicia marks along said gauge line in parallel relation to said needle indicator.

18. A measuring device as set forth in claim 16 wherein said means for moving said needle indicator includes a rotatable knob disposed on the exterior of said housing for actuating said needle indicator.

19. An eye measurer for measuring an eye comprising:
    a mirrored surface for reflecting the image of the eye to be measured,
    a gauge line representing the basic eye shape for the eye to be measured for alignment between said mirrored surface and the eye being measured, and
    indicating means along said gauge line for indicating the length of the eye image reflected from said mirrored surface.

20. An eye measurer as set forth in claim 19 which further comprises means for positioning a reflected image of said gauge line at a predetermined distance from said mirrored surface.

21. An eye measurer as set forth in claim 20 wherein said gauge line is formed on a transparent insert and said means includes an eye rest mounted over said mirrored surface to position said insert at a predetermined point above said mirrored surface.

22. An eye measurer as set forth in claim 19 which further comprises a lens mounted over said mirrored surface, said lens having a fixed focal length and the reflected image of said gauge line and the eye being measured are positioned in focused alignment at the focal point of said lens.

23. An eye measurer as set forth in claim 19 which further comprises a lens having a fixed focal length mounted over said mirrored surface, and means for positioning said gauge line at the focal point of said lens.

24. An eye measurer as set forth in claim 23 wherein said gauge line is formed on a transparent insert and said means includes a plate mounted in alignment with said mirrored surface and said lens, said insert being mounted on said plate in spaced relation over said lens at the focal point of said lens whereby the eye being measured and said gauge line are aligned substantially at the focal point of said lens.

25. An eye measurer comprising:
a housing,
a mirrored surface in one section of said housing,
a lens having a fixed focal length mounted over said mirrored surface, and
means for positioning a reflected image of a curvilinear gauge line representing a predetermined shape of eye at the focal point of said lens.

26. An eye measurer as set forth in claim 25 which further comprises a scale of indicia marks along said gauge line for indicating the measured length of an eye.

27. An eye measurer as set forth in claim 26 wherein said gauge line and said scale are formed as opaque marks on a transparent insert.

28. An eye measurer as set forth in claim 27 wherein said insert includes a curvilinear edge representing the predetermined shape of eye and said opaque gauge line is disposed along said edge.

29. An eye measurer as set forth in claim 28 wherein said insert further includes a projection at one end forming a notch with said edge to represent the corner of an eye.

30. An eye measurer as set forth in claim 27 wherein said means includes an eye rest mounted on said housing and projecting from said mirrored surface and said lens, said eye rest mounting said insert thereon at the focal point of said lens.

31. An eye measurer as set forth in claim 30 wherein said eye rest is a flexible plate and is removably mounted on said housing.

32. An eye measurer as set forth in claim 25 wherein said housing includes a well having a pair of walls defining an eye shape, said mirrored surface being mounted on the bottom of said well and wherein said means includes a flexible plate mounted in said well against the walls of said well.

33. An eye measurer as set forth in claim 25 wherein said housing includes a pair of mounting blocks, each mounting block having a wall for mounting a false eyelash thereon and a first scale disposed along said wall having indicia marks indicating the measured length of the eyelash, and wherein a second scale of indicia marks is formed along said gauge line for indicating the measured length of an eye, said first and second scales being keyed to each other whereby the length of false eyelash can be cut at the point corresponding to the measured length of eye.

34. An eye measurer as set forth in claim 33 wherein said well of each said mounting block is curvilinear.

References Cited

UNITED STATES PATENTS 1,266,208   5/1918   Bugbee et al.
3,050,860   8/1962   Kosh.

LOUIS G. MANCENE, Primary Examiner

G. E. McNEILL, Assistant Examiner